INVENTOR.
PETER M. TOLLIVER
BY
ATTORNEY

United States Patent Office 3,207,984
Patented Sept. 21, 1965

3,207,984
THERMISTOR AND DIODE BRIDGE CIRCUIT FOR THERMAL COMPENSATION OF A RESISTIVE LOAD
Peter M. Tolliver, Rochester, N.Y., assignor to General Dynamics Corporation, Rochester, N.Y., a corporation of Delaware
Filed Nov. 18, 1960, Ser. No. 70,273
9 Claims. (Cl. 324—105)

This invention relates to means for compensation for effects of ambient temperature changes in resistive loads and, more particularly, relates to compensating means which includes a thermistor and a diode for compensating for resistance changes with temperature in load devices.

On many occasions, it is necessary, when supplying a load from a regulated voltage source, to compensate for the effect of ambient temperature changes in the load which cause the load resistance to vary either directly or inversely with temperature. In some instances, the resistive load may have a positive temperature coefficient of resistance, while in other cases the resistive load may have a negative temperature coefficient of resistance. Thermistors are examples of resistive devices whose resistance increases more or less exponentially as ambient temperature decreases and vice versa. In applications requiring constant current through such a load device, constant voltage across such a load device, or maintain the resistance constant, a compensating means must be provided to compensate for the variations with a temperature of load current, resistance, or voltage. If a compensating means, comprising solely a thermistor or a thermistor combined with conventional resistors, is connected in circuit with the load, it is not possible to provide adequate compensation over a wide range of temperature variations unless the resistance versus temperature characteristic of the compensating thermistor or thermistor network is substantially identical with that of the load. Such a fortuitous circumstance would not be found in practice.

The means for compensating for resistance variation in a load with change in temperature employs a compensating network which includes a first parallel branch having a first resistor in series with a diode, a second parallel branch having a relatively small second resistor and a larger third resistor in series, and a compensating thermistor connected between the junction point of the first resistor and the diode and the junction point of the second and third resistors. The term "resistor," as used here, will refer to conventional resistors in contradistinction to thermistors, which constitute a singular class of resistors. If constant current through a load in spite of temperature variation is desired, the compensating network is positioned in series with a load having a positive temperature coefficient of resistance, but in shunt with a load having a negative temperature coefficient of resistance. If load voltages are to be maintained constant, then the compensating network is placed in series with a load having a negative temperature coefficient of resistance but in shunt with a load having a positive temperature coefficient of resistance. Whenever the load and the compensating network are disposed in parallel, it is essential that the compensating means include a resistor in series with the constant voltage supply; otherwise, the very low internal impedance of the voltage supply would not permit changes in impedance presented to the voltage supply by the compensating network to have an appreciable effect thereon. The compensating network and the series resistor of the compensating means together form a voltage divider whereby changes in resistance of the compensating network can have an appreciable effect upon the voltage supplied to the load. When the compensating network is positioned in series with the voltage supply, it may or may not be essential to use a series resistor as part of the compensating means. For example, the supply voltage may be so high, in the absence of a series resistor, that the voltage appearing across the compensating network is too high for proper operation of the diode and the thermistor. In this event, the compensating means must include a resistor in series with the voltage source in order to drop the voltage across the compensating network to a proper value.

Extreme care must be taken to maintain the temperature of the thermistor in the compensating network identical with the temperature of the temperature-sensitive element or elements in the load.

In the compensating network, according to the invention, the diode is in series with the thermistor, whereupon any change in thermistor resistance with temperature in the compensating network causes an inverse change in current through the diode; in other words, the diode resistance is caused to change with temperature in the same direction that the thermistor resistance changes. The diode thus augments the resistance versus temperature characteristic of the compensating thermistor and permits greater control over the resistance versus temperature characteristic of the compensating network. In this manner, one can adequately compensate for temperature responsive load resistance changes over a rather large temperature range, regardless of the resistance versus temperature characteristic of the load being compensated.

By means of the compensating network, according to the invention, a great degree of control exists over the shape and limits of the compensating network characteristic. The current through the first resistor largely establishes the bias necessary to hold the diode just below cutoff. Since the diode resistance at cutoff, as well as the thermistor resistance, is very large, the maximum resistance of the compensating network occurring near the lower temperature limit of operation can be shown to be nearly equal to the resistance of the third resistor. The lower limit of compensating network resistance existing at the maximum operating temperature approaches the resistance of the second resistor. In addition to controlling the two limits of the compensating network temperature versus resistance characteristic, the slope of this characteristic can be controlled by proper choice of the diode or thermistor, or both. In other words, the slope of the characteristic between the upper and lower limits depends upon the slope of the diode current versus resistance characteristic and upon the said slope of the resistance versus temperature characteristic of the particular thermistor employed. It is possible, therefore, to obtain readily a temperature versus resistance characteristic for the compensating network of any desired shape to fit the particular load to be compensated.

Also in accordance with the invention is the use of a compensating network which will insure that the resistance of a load is maintained unaffected by temperature variations of the load. In particular, thermistors have been used extensively in test equipment as RF power measuring elements. One example of such use of the thermistor is as a power absorbing terminating resistance in a coaxial or wave guide transmission line. Conventionally, the thermistor is operated as one arm of a Wheatstone bridge circuit and is biased with direct current energy to a selected operated resistance value in the absence of radio frequency power to be measured. Upon application of radio frequency energy to the thermistor, the resistance of the thermistor decreases from absorbing the RF energy, causing the bridge to become unbalanced. A deflection of a current meter in the bridge diagonal is obtained and, by calibrating the meter in terms of db power level, a radio frequency power level may be read directly from the meter.

When such power measuring equipment is used under widely varying ambient temperature conditons, it is necessary to temperature compensate the radio frequency thermistor in the bridge to prevent changes in radio frequency power indication, or the indication of RF power, as the case may be, arising solely because of temperature variation. One method of attempting to achieve this temperature compensation has been to shunt the bridge circuit with a compensating thermistor network. This compensating network, in response to ambient temperature changes, undergoes an impedance variation which causes more or less current to flow through the bridge circuit. In this manner, the bridge thermistor is biased to maintain the thermistor resistance at the proper value to achieve bridge balance, either in the absence of radio frequency energy or if the thermistor is being irradiated. Since thermistors have a negative temperature coefficient, the resistance of the bridge thermistor increases as temperature decreases. The variation of this resistance with temperature is substantially exponential, that is, the thermistor resistance R may be given by $R = eB/T$ where B is a constant depending upon the material and T is the temperature in degrees centigrade. The current which must be supplied to the thermistor branch of the bridge circuit in order to balance or to maintain balance of the bridge likewise increases substantially exponentially with decrease in ambient temperature. This means, of course, that the voltage across the bridge must increase with decrease in temperature. The current to be supplied to the other branch of the bridge circuit (the branch not containing a thermistor) must increase substantially linearly with decrease in temperature. The total current which must be supplied to the bridge circuit is equal to the sum of the currents in the two parallel branches of the bridge and varies at a faster than exponential rate of the temperature sensitive device in the load as temperature changes. The compensating network in parallel with the bridge circuit must function to shunt less current around the bridge circuit as temperature decreases in order to permit greater current flow through the bridge circuit; in other words, the resistance presented by the compensating circuit must also increase with decrease in temperature. It now becomes obvious that this result can be achieved only if the compensating circuit temperature versus resistance characteristic rises with decreasing temperature at a faster than the exponential rate for the same change in temperature as the bridge. The ordinary thermistor compensating circuit cannot fulfill this requirement over an appreciable temperature range since it can produce an increase of resistance with decreasing temperature only at a certain maximum exponential rate. If resistances are connected in parallel with the compensating thermistor, as is sometimes the case, the rate of change of resistance with temperature in such a circuit obviously will be reduced still further.

In accordance with the invention, a satisfactory solution to the problem of adequate temperature compensation for a radio frequency power measuring bridge circuit of the thermistor type can be obtained by introducing a diode in series with the thermistor in the compensating network. Such a diode is current sensitive; that is, its resistance is a function of the current flowing through it. The resistance of the diode, furthermore, varies more or less exponentially with current flow therethrough. If the ambient temperature decreases, the resistance of the thermistor increases more or less exponentially and, consequently, the current flowing through the thermistor decreases substantially exponentially. This current flowing through the thermistor, however, also flows through the series diode. Since the resistance of the diode increases more or less exponentially with decreasing current, the resistance of the compensating network increases at a rate greater than the exponential rate of either the diode or thermistor alone as ambient temperature decreases. Thus, the presence of the diode in the compensating network causes the resistance of the compensating network to change at a rate faster than would be the case if the diode were omitted. Hence, it is possible to compensate adequately for resistance variations with temperature in the bridge circuit.

Further objects and advantages of this invention will become more obvious from a description of the embodiments shown in the drawing wherein.

Figure 1:
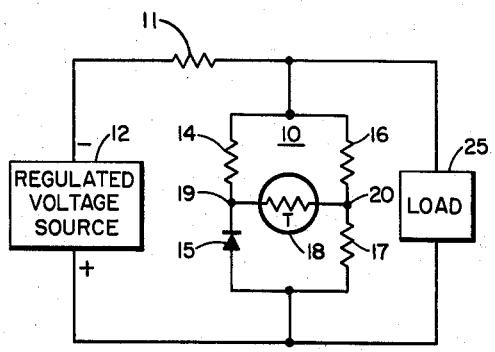
FIG. 1 illustrates a circuit, according to the invention, which is suitable either for maintaining constant current through a load having a negative temperature coefficient of resistance or for maintaining constant voltage across a load having a positive temperature coefficient of resistance.
Figure 2:
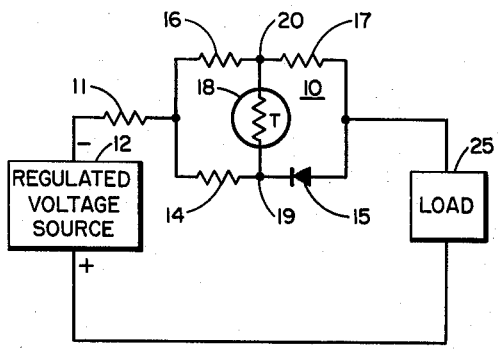
FIG. 2 illustrates a circuit, according to the invention, capable either of maintaining constant current through a load having a positive temperature coefficient of resistance or of maintaining constant voltage across a load having a negative temperature coefficient of resistance.
Figure 3:
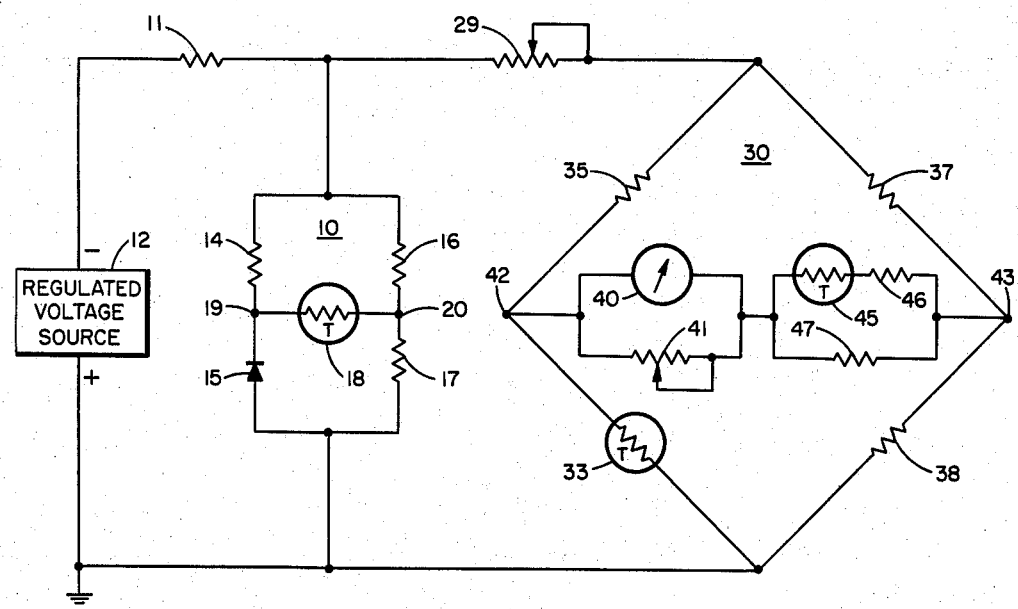
FIG. 3 is a temperature compensated radio frequency power measuring circuit, in accordance with the invention.

FIGS. 1 to 3 illustrate a compensating network 10 placed in circuit with a load 25 (FIGS. 1 and 2) or bridge circuit 30 (FIG. 3). A regulated voltage source 12 supplies unidirectional energy through a series dropping resistor 11 to the compensating network and load or network to be compensated. The compensating network 10 shown comprises a first parallel branch having a resistor 14 in series with a diode 15, a second parallel branch having resistors 16 and 17 in series, and a compensating thermistor 18 interconnecting the junction point 19 of resistor 14 and diode 15 and the junction point 20 of resistors 16 and 17. The compensating network 10 has four current paths, namely, (1) the first branch, (2) the second branch, (3) resistor 14 in series with compensating thermistor 18 and resistor 17, and (4) resistor 16 in series with thermistor 18 and diode 15. The current flowing through resistor 14 at the lower limit of ambient temperature should produce a voltage drop across this resistor which, when subtracted from the total voltage appearing across the compensating network 10, will provide a bias voltage across diode 15 sufficient to bias the diode just below, or substantially at, cutoff. The value of resistor 14 is chosen then, for a given value of voltage across network 10, to establish the current necessary to bias diode 15 substantially to cutoff. At cutoff, the diode resistance reaches a maximum value and becomes a predominant factor in determining the total resistance of the compensating network. Since the diode resistance, as well as the thermistor resistance, is high at or near the lower temperature operating limit, the total resistance of the compensating network then approaches that of resistor 16 and resistor 17 in series. The value of resistor 16, however, is made low as compared with that of resistor 17. Consequently, the upper limit of compensating network resistance, that is, the total resistance of the compensating network at the lower limit of operating temperature approaches the resistance of resistor 17. The current flowing through the thermistor 18 and diode 15 is limited to some extent by resistor 16.

The lower limit of compensating network resistance, that is, the total compensating network resistance at the upper limit of operating temperature is substantially equal to the resistance of resistor 16. The rate of resistance change with temperature of the particular compensating thermistor 18 used in the network, as well as the slope of the current versus resistance characteristic of diode 15, determines the slope of the resistance versus temperature characteristic of the compensating network between the limits of resistance selected by resistors 16 and 17. If the range of operating temperature is to be broad, it is necessary to use a thermistor of higher resistance, for any given temperature.

At the lower temperature extreme of operating temperatures, the path through resistor 14 and diode 15 has an extremely high resistance. Furthermore, the path through resistor 14, thermistor 18 and resistor 17 has a high resistance because of the relatively high resistance of the compensating thermistor 18 at low temperatures; similarly, the path through resistor 16, thermistor 18 and diode 15 has comparatively high resistance because of the high resistance presented by both thermistor 18 and diode 15. The total resistance of the compensating network 10 at the lower temperature extreme, therefore, is essentially that of a series path through resistors 16 and 17. Inasmuch as the resistance value of resistor 17 is made considerably larger than that of resistor 16, the total resistance of the compensating network 10 at the low temperature extreme is approximately equal to the value of resistor 17.

At the upper temperature extreme, the thermistor 18 and diode 15 each have a relatively low resistance. Since resistors 14 and 17 have substantial values of resistance, however, the current path including the comparatively small resistor 16, thermistor 18 and diode 15 is so small compared with that of the other current paths that the resistance of this path is controlling. As a matter of fact, the total resistance of the compensating network 10 assumes a value approaching that of resistor 16 alone.

In one application, the resistance values for resistors 14, 16 and 17 were in the order of 910 ohms, 33 ohms and 1500 ohms, respectively, when used with a type 27D1 thermistor and a type 1N457 diode. It should be understood, however, that these values are merely illustrative and that the invention is not limited to the specific resistance values.

At temperatures between two limits, the total resistance of the compensating network 10 increases as temperature decreases; furthermore, this resistance increases at a rate greater than the exponential rate of the thermistor in the load. The rate of change of compensating network resistance with temperature depends, in part, upon the characteristic of thermistor 18. Referring to FIGS. 1 and 2, as the ambient temperature of load 25 decreases, the resistance of the thermistor 18 in compensating network 10 increases. This causes the current flowing through thermistor 18 to decrease. Since a portion of this decreasing current also flows through diode 15 in series with thermistor 18, the resistance of the diode increases. The presence of diode 15 in the compensating network, therefore, causes the resistance of the compensating network to change at a faster rate than would be the case if the diode were omitted. Diode 15 thereby enables one to compensate for load resistance variations with temperature, particularly in applications wherein the resistance versus temperature characteristic of the load 25 is similar to that of the thermistor 18 used in compensating network 10.

The manner in which compensating network 10 is connected in circuit with the temperature sensitive load 25 and voltage source 12 will depend upon the load condition desired and also upon whether the load has a positive or negative temperature coefficient of resistance.

If a regulated voltage supply is used and a constant current through a load having a negative temperature coefficient of resistance is desired, the compensating network 10 is inserted in parallel with the load 25, as shown in FIG. 1. The compensating means includes series resistor 11 and compensating network 10. As the temperature increases, the resistance of load 25 will decrease; this tends to cause the current in the load to increase. The compensating means, therefore, must shunt additional current away from the load in order to maintain constant load current with temperature increase. As the temperature increases, however, the resistance of the compensating network 10 decreases; in this way, the proportion of the total current flowing in the compensating network will increase, thereby preventing a change in load current with load temperature. In accordance with the principles already set forth, the compensating network 10 can be designed to provide proper compensation for temperature changes in the load, regardless of the linearity of the resistance versus temperature characteristic of the load.

In the application just described, and in those to be described subsequently, the explanation has been based upon the assumption that the temperature increases. Obviously, the operation will be reversed if the load is subjected to a temperature decrease.

If constant current is to be maintained through a load having a positive temperature coefficient of resistance, the compensating network 10 is inserted in series with the load 25, as indicated in FIG. 2. If the temperature is assumed to increase, the load resistance likewise increases. In order to keep the current through the load constant, the total resistance of the entire network supplied by voltage source 12 must obviously remain unchanged; in other words, the series compensating network 10 must offer less resistance to the flow of current. The compensating network 10, because of the presence of thermistor 18 in series with diode 15, has a resistance versus temperature characteristic of opposite slope to that of the load. By proper design, the compensating network may be made to have substantially the inverse of the resistance versus temperature characteristic of the load. The value of this method of compensation is clearly evident when the resistance of load 25 varies with temperature in a non-linear or irregular manner.

For constant voltage across a load having a positive temperature coefficient of resistance, the compensating means includes a series resistor 11 and compensating network 10 which together form a voltage divider network between the source 12 and the load 25. The compensating network 10 is now inserted in parallel with the load, as shown in FIG. 1. If the temperature rises, the resistance of the load also increases, tending to increase the voltage across the load. The compensating network 10, however, undergoes a decrease in resistance with rising temperature, thereby decreasing the ratio of the compensating network resistance to the resistance presented by series resistor 11. Less voltage, consequently, appears across compensating network 10 which is directly across the load 25. Thus, any tendency of the load voltage to increase with increasing temperature is off-set by the reduction in voltage appearing across that portion of the voltage divider represented by the compensating network 10.

If it should be desirable to maintain constant voltage, regardless of load temperature change, across a load having a negative temperature coefficient of resistance, the arrangement shown in FIG. 2 is utilized. Here the compensating means includes resistor 11 and a compensating network 10 connected in series. As the temperature rises, the resistance of the load will decrease, tending to cause a lower voltage drop across the load. In order to keep the load voltage constant with decreasing temperature, it is necessary to decrease the series circuit resistance, so as to provide for a smaller voltage drop across resistor 11 and compensating network 10. Inasmuch as the latter has a negative temperature coefficient of resistance, the resistance which it contributes to the series circuit (including the load) decreases with rising temperature, thus providing the necessary compensation.

The circuit of either FIG. 1 or FIG. 2 can also be used to maintain constant resistance of the load 25 if the resistance of the temperature-sensitive device in the load is also current sensitive. An example of such a load is shown in FIG. 3.

FIG. 3 shows a Wheatstone bridge circuit 30 supplied from a well regulated direct current voltage source 12 for measuring radio frequency power. For example, radio frequency energy in a waveguide may be directed upon a bead-type thermistor 33 mounted within the waveguide and provided with connections external to the waveguide. This thermistor 33, which may be a type 32A3, or a similar thermistor which is capable of absorbing radio frequency energy, is connected to form one arm of bridge 30. The thermistor arm, together with an arm containing a fixed resistor 35, forms one branch of the bridge. The other branch of bridge 30 includes series resistors 37 and 38, both of which have the same resistance value as resistor 35. A series voltage dropping resistor 11 is provided in series with bridge circuit 30. An adjustable resistor 29 allows fine adjustment to be made in the voltage across the bridge circuit to obtain an exact null reading in the event of drift caused by uneven or rapid heating. The radio frequency thermistor 33 must be biased to such a value that this thermistor has the same resistance as the other resistors in the bridge arms in order to obtain balance. The bias on the thermistor 33 necessary to achieve this resistance value depends upon temperature; the voltage necessary increases as the temperature decreases. A current meter 40 calibrated to read in decibels is inserted in the bridge diagonal. As the radio frequency power incident upon thermistor 33 changes, the thermistor resistance changes. The bridge then becomes unbalanced and current flows through meter 40. The meter 40 is calibrated to read zero db at a certain power level, say, one milliwatt. If the meter should not read exactly zero db, for such power level, the meter calibration potentiometer 41 is adjusted to obtain zero db meter reading.

The diagonal of the bridge between points 42 and 43 includes a thermistor 45 and two fixed resistors 46 and 47. The purpose of this diagonal network is to provide for correct indication of incident radio frequency power in spite of variable sensitivity of the radio frequency thermistor 33 with temperature change. At lower temperatures, a given radio frequency power change will cause the resistance of the radio frequency thermistor 33 to decrease more than the same radio frequency power level change at higher temperatures. The sensitivity control network in the bridge diagonal undergoes a resistance variation compensating for differences in the resistance versus power characteristic of the radio frequency thermistor 33 at different temperature levels.

The compensating network 10 which compensates for resistance changes in the radio frequency bridge thermistor 33 arising from ambient temperature variations is similar to that shown in FIGS. 1 and 2 and already described. This temperature compensating network 10 is placed in shunt with the radio frequency bridge network 30. In order to explain the operation of the compensating network of FIG. 3, it will be assumed that the ambient temperature decreases for some reason. The sequence of changes would, of course, be reversed, if the temperature should increase. Since the radio frequency thermistor 33 has a negative temperature coefficient of resistance, its resistance will tend to increase with a decrease in temperature. This increase of resistance of the radio frequency thermistor, if uncompensated, would affect the current in the diagonal of the bridge and cause a change in the reading of meter 40, even though radio frequency power level were to remain unchanged or was absent, as the case may be. In other words, an ambient temperature change would produce an erroneous reading of radio frequency power, or produce a plus or minus reading in the absence of RF power, if not compensated for by compensating network 10. As the temperature decreases, the resistance of the thermistor 33 will tend to increase in a substantially exponential manner. The current that must be supplied to the thermistor branch of the bridge circuit in order to balance the bridge will increase with temperature decrease. The variation of current with temperature also is substantially exponential. In order to obtain greater current through the thermistor, the voltage across the bridge must increase as temperature decreases. The current to be supplied to the other branch of the bridge circuit contains series resistors 37 and 38 increases substantially linearly with temperature. The total current that must be supplied to the bridge circuit obviously is the sum of these currents in the two parallel bridge branches; the total bridge current, therefore, must increase at a faster than the exponential rate with decrease in ambient temperature and must decrease at a faster than the exponential rate with an increase in ambient temperature.

As the temperature decreases, the resistance of compensating thermistor 18 in the compensating network 10 increases. This increase of resistance with temperature of therinistor 18, like that of the radio frequency bridge thermistor 33, is substantially exponential. As the resistance of thermistor 18 increases, less current will flow in the series path through resistor 16, compensating thermistor 18 and diode 15. Because the diode 15 is current-sensitive, resistances of this diode increases as the current flow in the path containing thermistor 18 and diode 15 decreases; the resistance of diode 15 varies more or less exponentially with current flow through it. Consequently, the resistance of diode 15 increases as temperature decreases at a substantially exponential rate. The combined resistance of compensating network 10, therefore, is determined not only by the resistance increases with temperature decrease of thermistor 18, but also by the resistance increase with decreasing current of diode 15 resulting from the increase of resistance of thermistor 18. It is evident that the total resistance of the compensating network 10 increases with decreasing temperature at a much greater than the exponential rate. Thus, less current is shunted away from the bridge circuit 30, that is, more current is forced through the bridge circuit 30 to bias the thermistor 33 to the proper value for bridge balance, as the radio frequency thermistor tends to resistance increases with decreasing temperature. Moreover, the rate of decrease of shunting current in the compensating network is sufficient to compensate for the decrease in current traversing the bridge circuit.

Similarly, as ambient temperature rises, the resistance of compensating thermistor 18 decreases, more current flows through diode 15, the resistance of diode decreases, and the combined effect of the compensating network 10 is to decrease the total resistance shunting the bridge circuit at a greater than the exponential rate. More current then flows through the shunting compensating network 10 and less current is available in the bridge circuit 30 when the radio frequency bridge thermistor 33 undergoes a decrease in resistance with increasing temperature.

Interaction between the compensating circuit and the bridge is negligible as there is not a mutual change in temperature; hence, when RF energy is incident on the thermistor 33, the meter indicates the power substantially independently of the compensating effects of the compensating circuits. Ordinarily, a resistance change with temperature in thermistor 33 is followed by a proportional resistance change in the compensating network. As previously stated, the temperature of the thermistor 18 in the compensating network 10 must be maintained identical with the temperature of the temperature sensitive elements 33 and 45 of the bridge 30 for proper operation. This can be achieved, for example, by mounting disc thermistors 18 and 45 contiguous with the walls of the waveguide which is supplying radio frequency energy to be measured, while mounting the radio frequency bead thermistor 33 in a capsule inserted within the waveguide.

What is claimed is:

1. In combination, a load means adapted to be energized from a regulated voltage source and characterized by a change in resistance with operating temperature variations, and a compensating network in circuit with said load means for compensating for resistance change with temperature in said load means, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

2. In combination, load means having a negative temperature coefficient of resistance, said load means being energized from a source of regulated unidirectional voltage, compensating means for maintaining a constant voltage across said load means in spite of variations in ambient temperature to which said load means is exposed, said compensating means including a network positioned in series with said load means, said network comprising a first branch including a first resistor in series with a diode, a second branch in parallel with said first branch and including a second resistor and a third resistor in series, and a thermistor connected between the junction point of said first resistor and said diode and the junction point of said second and third resistors.

3. In combination, load means having a positive temperature coefficient of resistance, said load means being energized from a source of regulated unidirectional voltage, compensating means for maintaining a constant voltage across said load means in spite of variations in ambient temperature to which said load means is exposed, said compensating means including a network positioned in parallel with said load means, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

4. In combination, load means having a negative temperature coefficient of resistance, said load means being energized from a source of regulated unidirectional voltage, compensating means for maintaining a constant current through said load means in spite of variations in ambient temperature to which said load means is exposed, said compensating means including a network positioned in parallel with said load means, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

5. In combination, load means having a positive temperature coefficient of resistance, said load means being energized from a source of regulated unidirectional voltage, compensating means for maintaining a constant current through said load means in spite of variations in ambient temperature to which said load means is exposed, said compensating means including a network positioned in series with said load means, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

6. In combination, a bridge circuit comprising a first branch, a second branch in parallel with said first branch and a diagonal including a current measuring device, each of said branches including two resistive arms connected in series, one of said arms of said first branch containing a thermistor exposed to radio frequency energy which causes the resistance of said thermistor to depend upon the magnitude of said energy, said current measuring device indicating the radio frequency energy level in accordance with the degree of unbalance of said bridge circuit, and a compensating network connected in parallel with said bridge circuit for compensating for resistance variation of said thermistor with ambient temperature change, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

7. A combination as recited in claim 6 wherein said diode is biased substantially to cut-off at the lower limit of operating temperature.

8. In combination, a bridge circuit comprising a first branch, a second branch in parallel with said first branch and a diagonal including a current measuring device, each of said branches including two resistive arms connected in series, one of said arms of said first branch containing a resistor having a negative temperature coefficient of resistance exposed to radio frequency energy which causes the resistance of said resistor to depend upon the magnitude of said energy, said current measuring device indicating the radio frequency energy level in accordance with the degree of unbalance of said bridge circuit, and a compensating network connected in parallel with said bridge circuit for compensating for resistance variation of said resistor with ambient temperature change, said compensating network comprising a first branch including a first resistor in series with a diode, a second branch in parallel with said first branch and including a second resistor and a third resistor in series, and a thermistor connected between the junction point of said first resistor and said diode and the junction point of said second and third resistors.

9. In combination, a bridge circuit comprising a first branch, a second branch in parallel with said first branch and a diagonal including a current measuring device, each of said branches including two resistive arms connected in series, one of said arms of said first branch containing a thermistor having a negative temperature coefficient of resistance exposed to radio frequency energy which causes the resistance of said thermistor to depend upon the magnitude of said energy, said current measuring device indicating the radio frequency energy level in accordance with the degree of unbalance of said bridge circuit, and a compensating network connected in parallel with said bridge circuit for compensating for resistance variation of said thermistor with ambient temperature change, said compensating network comprising a first branch including a diode, a second branch in parallel with said first branch and including a first resistor and a second resistor connected in series, and a thermistor connected to said diode and to the junction between said first and second resistors to define a common current path with said diode and said first resistor.

References Cited by the Examiner

UNITED STATES PATENTS

| 2,413,033 | 12/46 | Potter | 323—68 |
| 2,452,551 | 11/48 | Conant | 324—105 |
| 2,495,268 | 1/50 | Liephart | 324—105 |
| 2,734,163 | 2/56 | Ault | 323—68 |
| 3,079,556 | 2/63 | Connelly et al. | 324—105 |

OTHER REFERENCES

Keonjian et al.: "Shaping of the Characteristics of Temperature - Sensitive Elements," A.I.E.E. Transactions, Commun. & Electronics, 73 (1954), pp. 396–400.

Farhi et al.: "Design of Resistive Temperature Compensation by Single and Multiple Thermistor Networks" A.I.E. Transactions, Commun. & Electronics, 80 (1961), pp. 246–253.

WALTER L. CARLSON, *Primary Examiner.*

BENNETT G. MILLER, FREDERICK M. STRADER, *Examiners.*